Oct. 4, 1960 J. T. SEMANCIK 2,955,151

TELETYPEWRITER SWITCHING SYSTEM

Filed April 30, 1958 6 Sheets-Sheet 1

INVENTOR
J. T. SEMANCIK
BY *John E. Cassidy*
ATTORNEY

INVENTOR
J. T. SEMANCIK
BY John E. Cassidy
ATTORNEY

TELETYPEWRITER SWITCHING SYSTEM

Filed April 30, 1958 6 Sheets-Sheet 3

INVENTOR
J. T. SEMANCIK
BY
ATTORNEY

Oct. 4, 1960 J. T. SEMANCIK 2,955,151
TELETYPEWRITER SWITCHING SYSTEM
Filed April 30, 1958 6 Sheets-Sheet 4

INVENTOR
J. T. SEMANCIK
BY John E. Cassidy
ATTORNEY

Oct. 4, 1960 J. T. SEMANCIK 2,955,151

TELETYPEWRITER SWITCHING SYSTEM

Filed April 30, 1958 6 Sheets-Sheet 5

INVENTOR
J. T. SEMANCIK
BY John E. Cassidy
ATTORNEY

Oct. 4, 1960 J. T. SEMANCIK 2,955,151

TELETYPEWRITER SWITCHING SYSTEM

Filed April 30, 1958 6 Sheets-Sheet 6

INVENTOR
J. T. SEMANCIK
BY John E. Cassidy
ATTORNEY

United States Patent Office 2,955,151
Patented Oct. 4, 1960

2,955,151

TELETYPEWRITER SWITCHING SYSTEM

Joseph T. Semancik, White Plains, N.Y., assignor to American Telephone and Telegraph Company, a corporation of New York Filed Apr. 30, 1958, Ser. No. 731,955
4 Claims. (Cl. 178—2)

Figure 1:
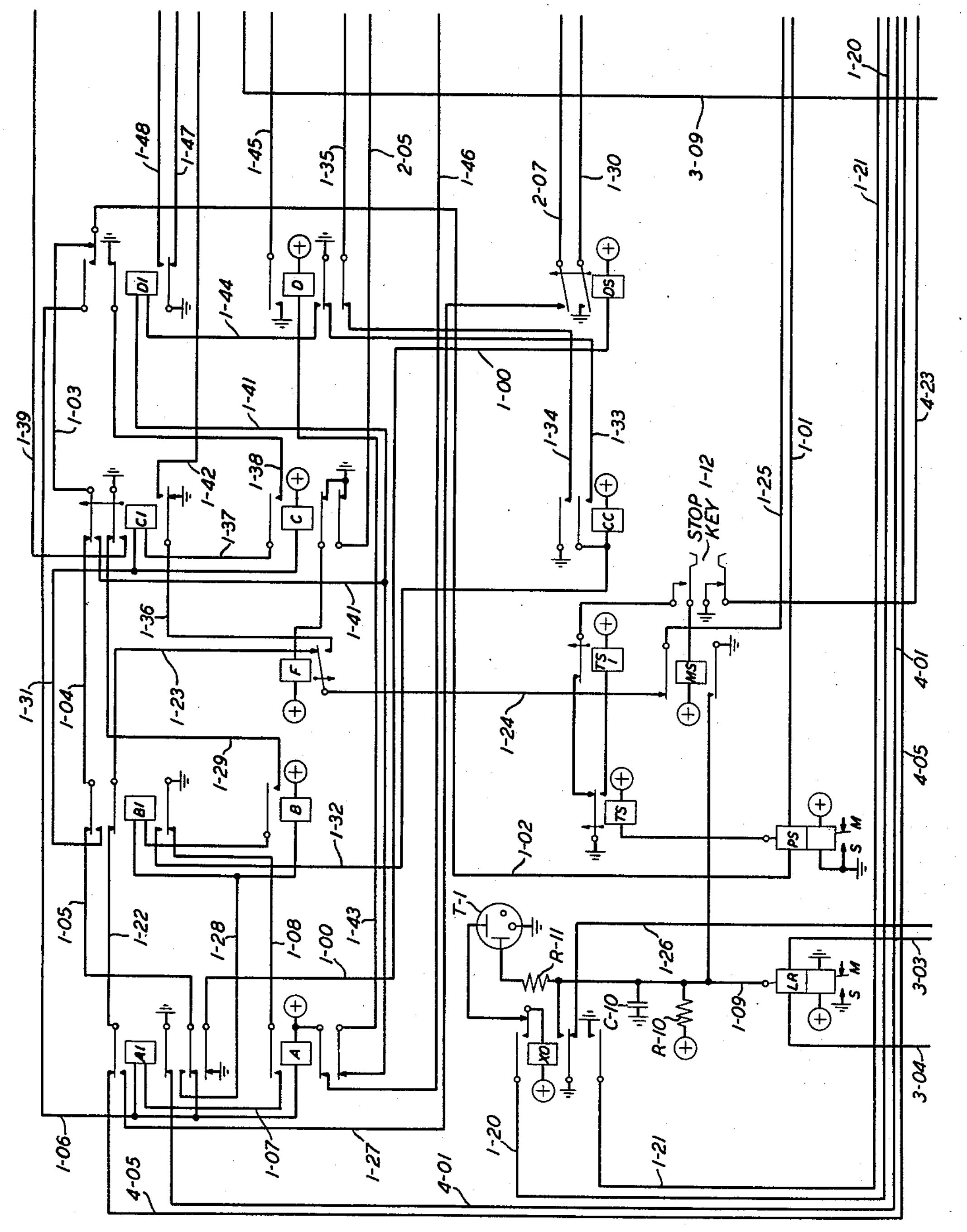

This invention relates to a two-way multistation telegraph communication system and more particularly to a central station for automatically and selectively testing a plurality of remote stations for message material.

It is a broad object of this invention to provide an improved station control circuit which permits either a message transmitter or a code transmitter to send a line without interference with each other.

Another object is to provide an improved full duplex multistation selection system especially adapted for a transmission of short messages.

In previous types of full duplex multistation communication systems, a transmitter start code transmitter is employed at the central station to generate and transmit transmitter start code sequences, one at a time and in rotation, for selectively starting remote station transmitters. The code transmitter is accorded preference over the central station message transmitter insofar as the code transmitter may interrupt the message transmitter in the transmission of a message to a remote station to sequentially poll the outlying stations for message material. The message transmitter can restart when an outlying station is successfully polled or all the outlying stations are polled without starting an outlying station transmitter. In the latter case, the code transmitter pauses for a predetermined time and again interrupts the message transmitter to resume the polling cycle.

A further object of this invention is to enable the code transmitter to continuously send start code sequences so long as an outlying station transmitter is not started.

Another object is to enable the central office message transmitter to interrupt the code transmitter when the message transmitter is supplied with message material and a predetermined number of outlying stations have been unsuccessfully polled.

Another object is to prevent the message transmitter from restarting after the transmission of a long message until the code transmitter sends a predetermined number of start code sequences.

In accordance with a specific embodiment of the present invention, a five-stage counting circuit is provided for counting the number of start code sequences transmitted by a start code transmitter. After five outlying station transmitters are unsuccessfully polled, the counting circuit conditions a message transmitter start circuit to give the message transmitter an opportunity to start, if a message is ready, after each unsuccessful polling of an outlying station. If the message transmitter is started, the message transmitter start circuit interrupts the code transmitter and resets the counter and the code transmitter resumes the polling cycle after the conclusion of the message transmission. Upon a successful polling of an outlying station, a detector circuit responds to the resultant reception of the message by momentarily conditioning the message transmitter start circuit and resetting the counter.

Another feature of this invention is a timing circuit which times the duration of the operation of the message transmitter. If the message transmission exceeds a predetermined time interval, the timing circuit operates to disable the detector circuit whereby the message transmitter cannot start, if any outlying station is successfully polled, until five start code sequences are transmitted whereupon the counter circuit functions to release the timing circuit.

Figure 6:
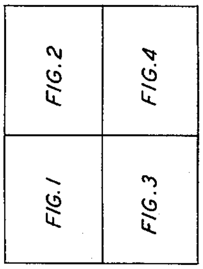
Figure 5:
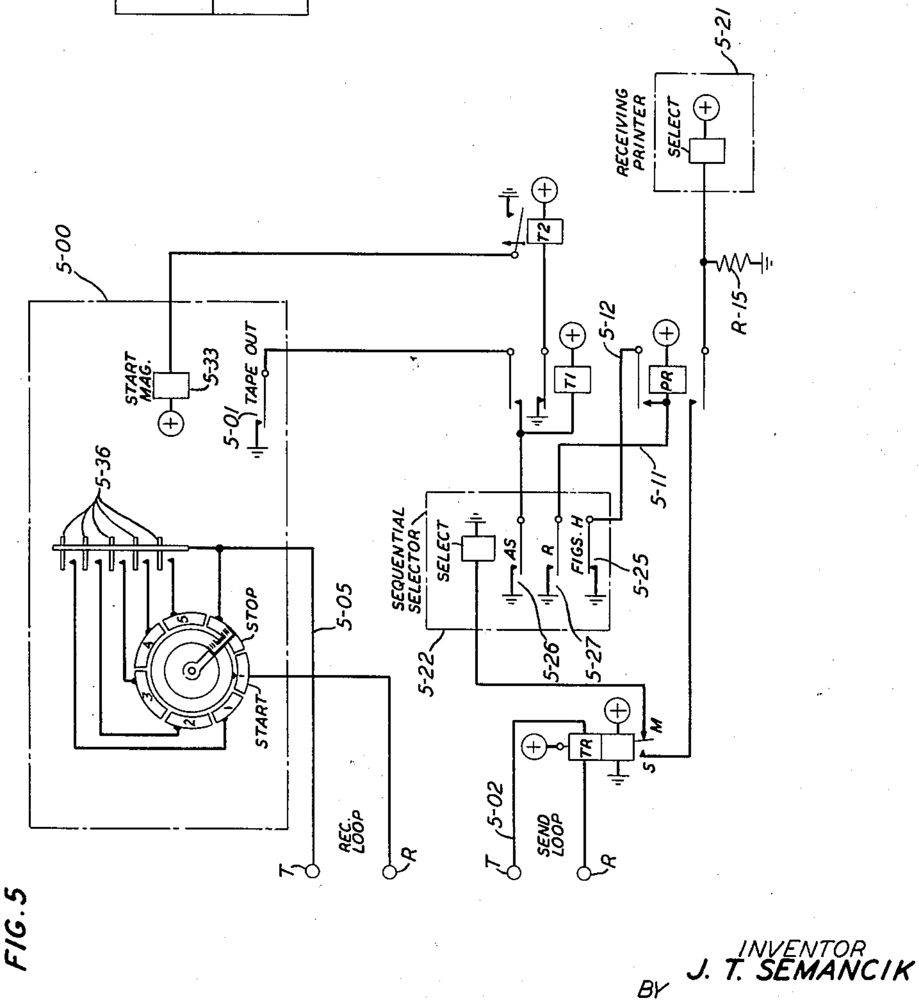
Figure 7:
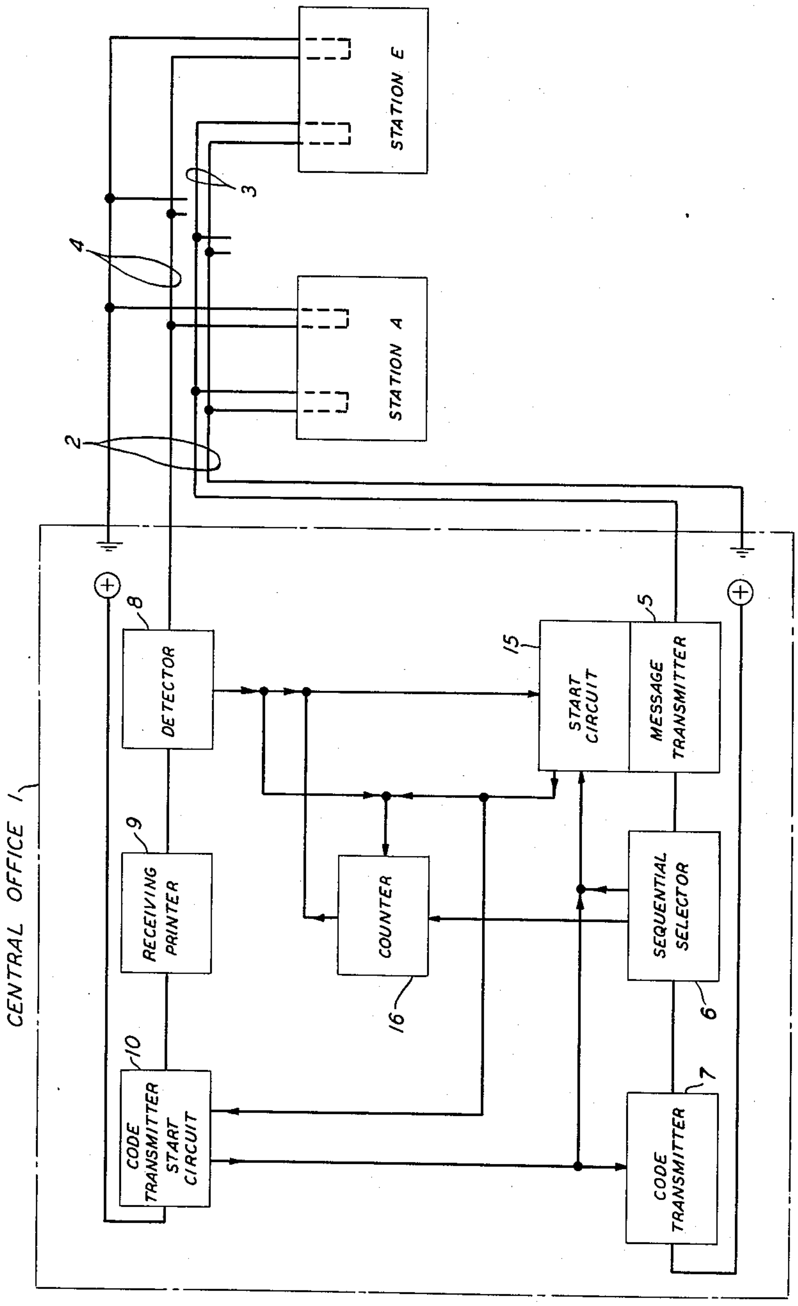

The means for fulfilling the foregoing objects and the practical embodiment of the features of this invention will be fully understood from the following description taken in conjunction with the accompanying drawings wherein:

Figs. 1 through 4, when arranged as shown in Fig. 6, show the details of circuits and equipments which cooperate to form a typical control station in accordance with this invention;

Fig. 5 shows the details of circuits and equipments which form a typical outlying station; and Fig. 7 illustrates in block form the layout of the various circuits and equipments to form the typical central station and the manner in which they cooperate with the outlying stations.

Referring now to Fig. 7, a typical full-duplex party line 2 is shown extending from a central station, generally indicated by block 1, to five outlying stations of which only two, namely, station A and station E, are shown in Fig. 7. It is to be understood that any number of outlying stations may be served by partly line 2.

Party line 2 comprises a sending loop or channel 3 for transmitting signals from central station 1 to the outlying stations and a receiving loop or channel 4 for transmitting signals from the outlying stations to central station 1. Sending loop 3 and receiving loop 4 have been shown as separate metallic transmission circuits. It is to be understood, however, that these loops may include any of the usual types of transmission channels suitable for the transmission of telegraph signals in both directions simultaneously.

In general, central station 1 is provided with message transmitter 5, sequential selector 6, and code transmitter 7, all associated with sending loop 3 and receiving loop detector 8, receiving printer 9 and code transmitter start circuit 10, all associated with receiving loop 4. Receiving printer 9 may be a page printer similar to the type disclosed in Patent No. 1,904,164, granted to S. Morton et al. on April 18, 1933, or a typing reperforator similar to the type described in Patent No. 2,255,794 to R. A. Lake on September 16, 1951. Message transmitter 5 may be a tape transmitter distributor similar to the type described in Patent No. 2,055,567, granted to E. F. Watson on September 29, 1936. The disclosures of all of these patents and of all patents hereinafter referred to are hereby incorporated herein by reference as though fully set forth herein.

Sequential selector 6 follows the signals on sending loop 3 and opens or closes selected contacts in response to predetermined sequences of code signals. A sequential selector suitable for use in this system is disclosed in Patent No. 2,568,264 granted to W. J. Zenner on September 18, 1951.

Each of the outlying stations is also provided with a sequential selector and transmitting and receiving apparatus which may be similar to the selector, message transmitter and receiving printer employed at central station 1.

Messages destined for outlying stations may be prepared on tape by the central station operator or a central station typing reperforator. A suitable format for the message includes one or more selection code sequences, for selecting desired outlying station printers, followed by an end-of-address code sequence, the message text and an end-of-message code sequence.

Assuming that a message tape is inserted in message transmitter 5 and message transmitter 5 is started, start circuit 15 associated with message transmitter 5 now blocks start circuit 10 and the message is transmitted out over sending loop 3. At the conclusion of the message, the end-of-message signal is transmitted and sequential selector 6, following the outgoing line signals, responds by disabling start circuit 15 which unblocks start circuit 10.

Start circuit 10 provides the instructions and codings for code transmitter 7 enabling code transmitter 7 to transmit out, over sending loop 3, transmitter-start code sequences which start selected outlying station transmitters supplied with message material. If receiving loop 4 is idle, with start circuit 10 unblocked, code transmitter 7 is instructed to send a first start code sequence to poll a selected outlying station transmitter. Sequential selector 6, following the outgoing line signals, responds by registering a count of one in counter 16. If the selected outlying station does not have message material, receiving loop 4 remains idle and start circuit 10 instructs code transmitter 7 to send a second start code sequence which sequential selector 6 registers in counter 16 for a count of two.

When five start code sequences are sent without starting an outlying station transmitter, counter 16 has a registered count of five, whereupon counter 16 enables message transmitter start circuit 15 permitting message transmitter 5 to start if a message tape has been inserted in message transmitter 5. Assuming that message transmitter 5 does not have a message tape and the selected outlying station transmitter is not started by the fifth start code sequence, receiving loop 4 remains idle and code transmitter start circuit 10 instructs code transmitter 7 to send the next successive start code sequence and blocks message transmitter start circuit 15 while the start code sequence is being transmitted. Since counter 16 has a full five count registration, sequential selector 6 does not advance counter 16 at this time and after the sixth start code sequence is sent, message transmitter 5 is again given an opportunity to send.

Detector 8, associated with receiving loop 4, follows the incoming line signals to determine whether an outlying station transmitter is started. If, after the transmission of any start code sequence, incoming line signals are detected, detector 8 resets counter 16, removing the previously registered count, and enables message transmitter start circuit 15 thus permitting message transmitter 5 to start if it is supplied with tape.

Assuming that message transmitter 5 starts after five outlying stations are unsuccessfully polled or an outlying station transmitter is started, start circuit 15 then resets counter 16, if it had not been previously reset and again blocks code transmitter start circuit 10. Thus, message transmitter 5 is enabled to transmit the message and at the conclusion of the message the outlying station transmitters will again be polled for message material in the same manner as previously described.

Referring now to Figs. 1, 2, 3, and 4 showing the detailed circuitry of the central station and more particularly to Fig. 1, when battery is turned on, slow-to-release relay F operates due to the path from battery via the winding of relay F and lower break contacts of relay C to ground and slow release relay DS operates due to the path from battery by way of the winding of relay DS, lead 1–00 and lower break contacts of relay A1 to ground.

Figure 2:
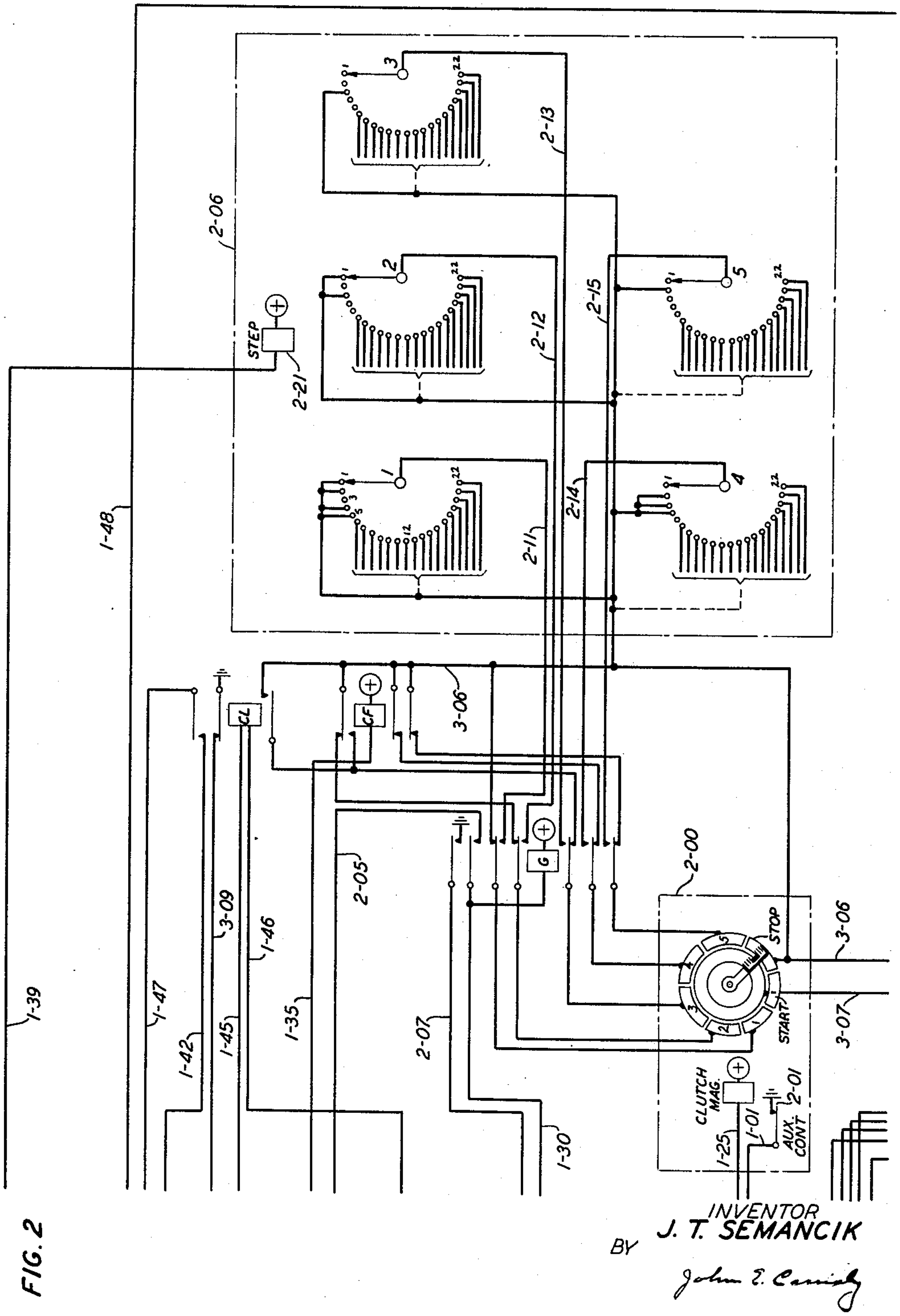
Figure 3:
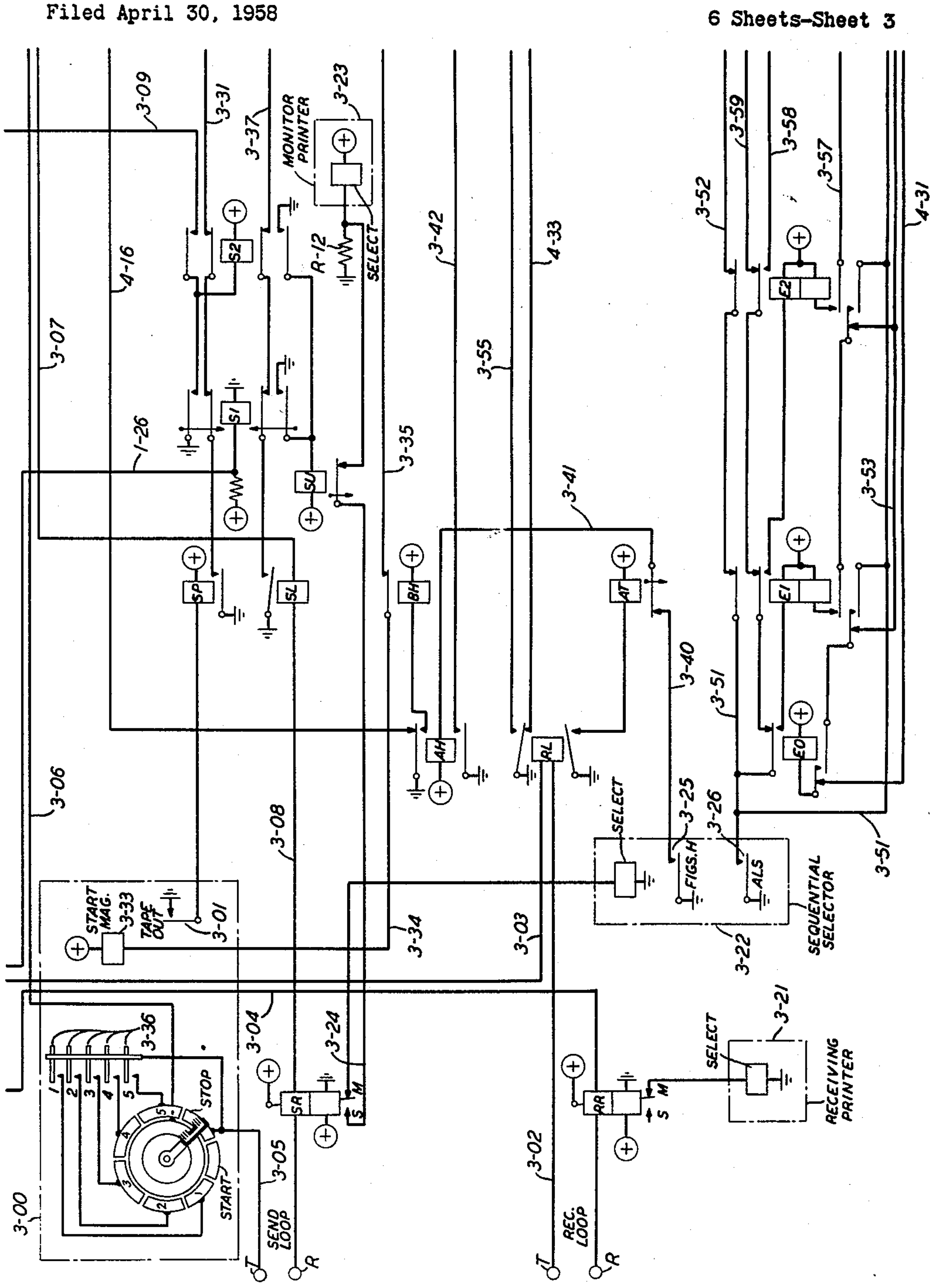

Referring now to Fig. 3, the R and T connections of the sending loop are connected by way of lead 3–05, the distributor stop segment, brushes and common segment of the message transmitter-distributor generally indicated at 3–00, lead 3–06, the stop segment, the brushes and the common segment of the coding distributor, Fig. 2, generally indicated at 2–00, lead 3–07, winding of relay SL, Fig. 3, lead 3–08 and the winding of polarized relay SR whereby relay SL and relay SR follow outgoing line signals. Battery through the marking contact of relay SR is connected through the winding of the select magnet of the sequential selector, generally indicated at 3–22, to ground, whereby sequential selector 3–22 follows outgoing line signals. Sequential selector 3–22 is similar to the type described in the aforementioned patent to Zenner and contains momentarily operable contacts 3–25 and 3–26. As more fully described in the Zenner patent, sequential selector 3–22 is placed in the select condition in response to a predetermined code sequence as, for example, an outgoing Figures H character sequence and momentarily closes contacts 3–25 and is placed in the unselect condition by a Carriage-Return Line-Feed sequence. During the select condition, any outgoing sequence of an upper case character followed by the character S momentarily closes contacts 3–26.

The spacing contact of relay SR provides shunting battery for the select magnet of the monitor printer, generally indicated at 3–23, by way of lead 3–24 and the break contacts of slow release relay SU. Since the select magnet of monitor printer 3–23 is maintained in the idle marking condition by current from battery via the select magnet and resistor R–12 to ground, monitor printer 3–23 is blinded when relay SU is operated and prints the outgoing line signals when relay SU is released.

The R and T connections of the receiving loop are connected via lead 3–02, the winding of relay RL, conductor 3–03, winding of polar relay LR, Fig. 1, lead 3–04 and the winding of polar relay RR whereby relay RL, relay RR and relay LR follow incoming line signals. The marking contact of relay RR is connected to the select magnet of the receiving printer, generally shown at 3–21, whereby the receiving printer prints the incoming line signals.

When coding distributor 2–00 is not sending, auxiliary contacts 2–01 are closed and a path is completed from battery by way of the winding of relay A, Fig. 1, lead 1–06, break contacts of lower transfer contacts of relay A1, lead 1–05, break contacts of upper transfer contacts of relay B1, lead 1–04, break contacts of upper transfer contacts of slow release relay C1, lead 1–03, break contacts of make-before-break contacts of relay D1, lead 1–02, winding of polarized relay PS, lead 1–01 and auxiliary contacts 2–01 of distributor 2–00 to ground, operating relay A and operating the armature of relay PS to its marking contact.

Relay A operated completes a path from ground by way of break contacts of lower transfer contacts of relay B1, lead 1–08, upper make contacts of relay A, lead 1–07, the winding of relay A1, lead 1–06 and the winding of relay A to battery holding relay A operated. Relay A1 does not operate at this time, however, due to the shunting ground on lead 1–06 of the auxiliary contact pulsing lead.

The operator prepares each message by punching in the tape the selection codes for the desired outlying station printers followed by the end-of-address code sequence Carriage-Return Line-Feed. The operator then punches the message text followed by the end-of-message code sequence Figures H Letters. The message tape may contain one or a plurality of individual messages.

Assuming that a message tape is inserted in transmitted distributor 3–00, tape-out contacts 3–01 close completing an obvious operating path for relay SP. Relay SP operated completes a path from ground by way of the make contacts of relay SP, break contacts of slow operate relay S1, break contacts of relay S2, lead 3–31, break contacts of relay FH, Fig. 4, lead 4–11, the winding of relay SZ1, the break contacts of the make-before-break contacts of relay SZ1, lead 4–12 and the lower break contacts of relay SZ2 to battery, operating relay SZ1 which locks via the make contacts of its make-before-break contacts. Relay SZ1 operated completes a path from ground by way of the make contact of the upper transfer contacts of relay SZ1, lead 4–13, and the winding of relay CA to battery. Relay CA operated completes the energizing path for start magnet 3–33 of transmitter distributor 3–00 from battery by way of the winding of the start magnet 3–33 of transmitter distributor 3–00, lead 3–34, break contacts of relay BH, lead 3–35, break contacts of relay FH, lead 4–15, make contacts of relay CA, lead 4–16 and the break contacts of the transfer contacts of relay AH, Fig. 3. With start magnet 3–33 energized transmitter distributor 3–00 is started and opens and closes the sending loop in accordance with the rotation of the distributor and the operations of sensing pins 3–36 which sense the perforations in the message tape.

As transmitter distributor 3–00 sends the message tape signals to the sending loop, relay SR, relay SL, sequential selector 3–22 and monitor printer 3–23 follow the outgoing signals, as previously described. Relay SL, in following the outgoing signals, periodically completes a path from ground via the break contacts of relay SL, the break contacts of relay S1, the break contacts of relay S2, lead 3–37 and the winding of slow release relay SL1, Fig. 4, to battery. Relay SL1 is thus operated and, since it is slow release, maintained operated while transmitter distributor is sending,. The functions of relay SL1 are subsequently described.

When transmitter distributor 3–00 sends the end-of-address code from the message tape, sequential selector 3–22, which is following the outgoing signals, is placed in the unselected condition whereby contacts 3–26 cannot operate during the transmission of the message text. At the conclusion of the message, end-of-message signal Figures H Letters is sent, sequential selector 3–22 is placed in the select condition and contacts 3–25 are momentarily closed placing ground on lead 3–40. If at this time signals are being received from an outlying station, detector relay RL is following the incoming signals, as previously described, and periodically closing an obvious operating path by way of its lower break contacts for slow release relay AT, maintaining relay AT operated while the central station is receiving signals. Relay AT operated opens lead 3–40 and thus the momentary operation of contacts 3–25 perform no function if incoming signals are being received. Consequently, the next message in the message tape will now be transmitted in the same manner as the previous message. If the previous message is the last message in the tape, tape-out contacts 3–01 open releasing relay SP which, in turn, opens the operating path for relay SZ1. Relay SZ1 released releases relay CA which in turn opens the energizing path for start magnet 3–33, stopping transmitter distributor 3–00.

Assuming now that the receiving loop is in the idle marking condition and relay AT is released when contacts 3–25 momentarily close in response to the end-of-message signal, a path is completed from ground by way of contacts 3–25, lead 3–40, the break contacts of relay AT, lead 3–41 and the winding of relay AH to battery. Relay AH operated opens the energizing path for start magnet 3–33 via the break contacts of the transfer contacts of relay AH stopping transmitter distributor 3–00 and completes an obvious operating path for fast operating relay BH via the make contacts of the transfer contacts and relay BH, in turn, further opens the start magnet energizing path. In addition, relay AH operated completes a path from ground via the lower make contacts of relay AH, lead 3–42 and the winding of relay FH, Fig. 4, to battery, operating relay FH which locks by way of its lower make contacts, lead 4–21, upper break contacts of relay E5, lead 4–22, lower break contacts of relay HL, lead 4–23 and the break contacts of key 1–12, Fig. 1, to ground. The subsequent reopening of selector contacts 3–25 releases relay AH followed by the release of relay BH.

Relay FH operated further opens the start magnet energizing path and opens the previously described operating and locking path for relay SZ1 which releases, in turn releasing relay CA.

Since transmitter distributor 3–00 is no longer sending, the sending loop is in the idle marking condition and relay SL is maintained operated, opening the operating path for slow release relay SL1 which releases.

When the receiving loop is in the idle marking condition, the armature of relay LR, Fig. 1, is operated to its marking contact, removing ground from lead 1–09 and condenser C–10 slowly charges from positive battery by way of resistor R–10. This gradually increasing voltage is applied to the control anode of gas tube T1 by way of resistor R–11. After about five seconds condenser C–10 sufficiently charges to fire tube T–1 and plate current is drawn from positive battery by way of the winding of relay X0 and the break contact of the make-before-break contacts of relay X0, operating relay X0 which locks to lead 1–20 by way of the make contacts of the make-before-break contacts. If tape transmitter distributor 3–00 is sending at this time, relay SZ1 is operated, as previously described, and lead 1–20 is open at the upper break contacts of relay SZ1 and relay X0 releases. Thus, with transmitter 3–00 sending, relay X0 momentarily operates, opens the plate circuit of tube T–1, extinguishing the tube, and momentarily applies ground to lead 1–09 by way of the make contacts of the lower transfer contacts of relay X0 to discharge condenser C–10. Relay X0 also applies a momentary ground on lead 1–21 by way of lower make contacts of relay X0. However, with transmitter 3–00 sending, lead 1–21 is open at the upper break contacts of relay SL1 operated, Fig. 4. In addition, ground applied to lead 1–26 by way of the make contacts of the lower transfer contacts of relay X0, shunting the winding of slow operate relay S1, Fig. 3, is momentarily removed. However, relay S1, being slow operate, does not have sufficient time to operate. Thus, with the receiving loop in the idle marking condition, tube T–1 fires every five seconds, momentarily operating relay X0, which extinguishes the tube, but no further function is performed at this time.

When transmitter 3–00 completes sending, relay FH operates and locks, relays SZ1 and SL1 release as previously described and relay X0 operated now locks to ground via lead 1–20, the upper break contacts of relay SZ1, lead 4–01 and the lower break contacts of relay A1. Tube T–1 is extinguished and condenser C–10 is discharged, as previously described, and the shunting ground on the winding of relay S1 applied to lead 1–26 is removed permitting slow operate relay S1 to operate. This completes a path from battery by way of the winding of relay S2 and the upper make contacts of relay S1 to ground operating relay S2. Relay S2 locks by way of its own upper make contacts, lead 3–09 and the upper break contacts of relay CL, Fig. 2, to ground. Relays S1 and S2 operated open the previously described operating paths for relays SL1 and SZ1 and complete individual operating paths for slow release relay SU thus blinding monitor printer 3–23 to outgoing signals, as previously described. As will appear hereafter monitor printer is maintained blinded during the transmission of the starting code sequence.

Figure 4:
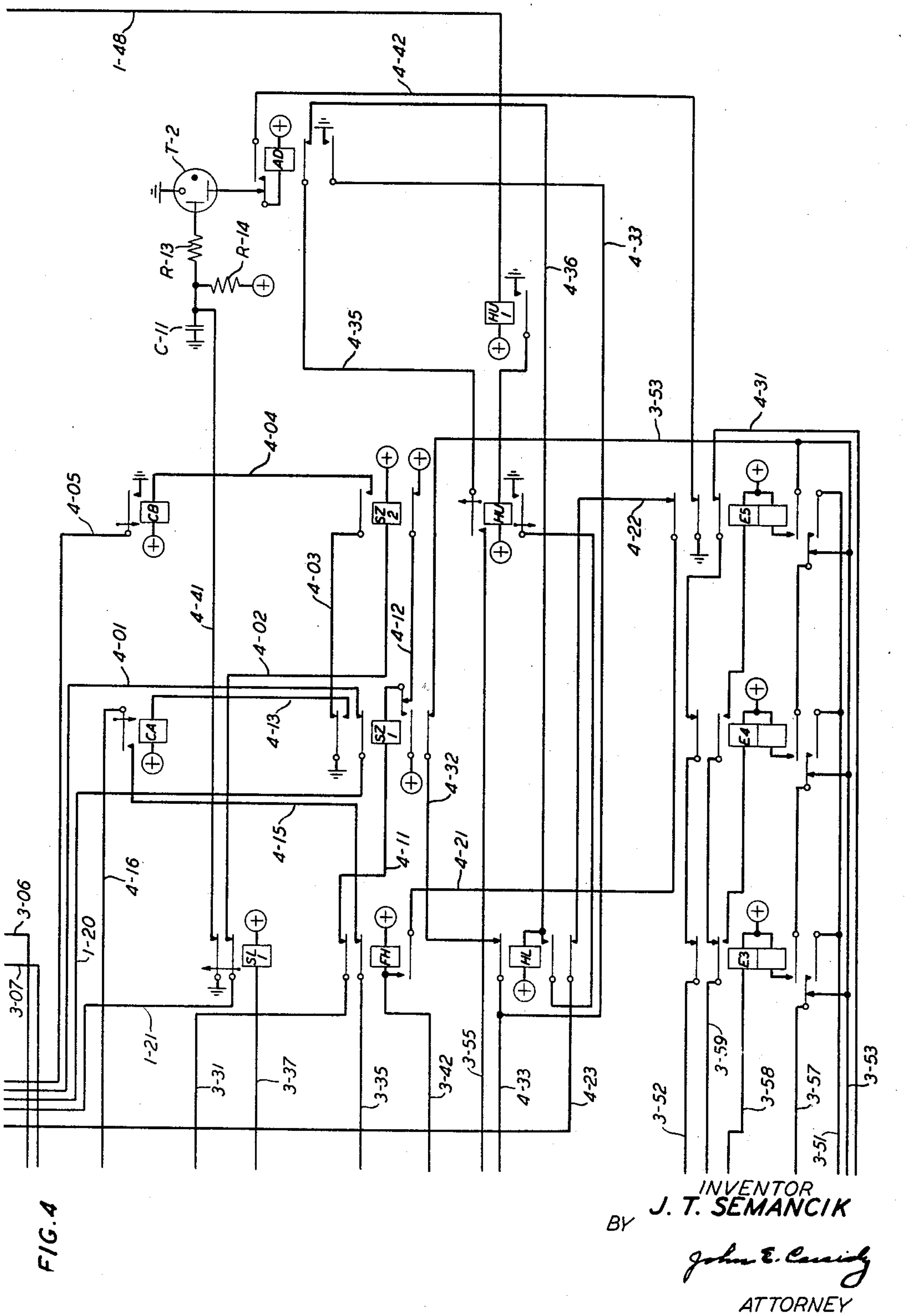

Returning now to the operation of relay X0, a path is completed from ground to positive battery by way of lower make contacts of relay X0, lead 1–21, upper break contacts of slow release relay SL1, Fig. 4, lead 4–02 and the winding of relay SZ2. The operation of relay SZ2 completes a path from battery by way of the winding of slow operate relay CB, lead 4–04, upper make contacts of relay SZ2, lead 4–03 and upper break contacts of relay SZ1 to ground. Relay CB operated completes a path from ground by way of the upper make contacts of relay CB, lead 4–05, break contacts of the upper transfer contacts of relay A1, Fig. 1, lead 1–22, upper break contacts of relay B1, lead 1–23, make contacts of relay F operated, lead 1–24, break contacts of relay MS, lead 1–25 and clutch magnet 2–02 of the distributor 2–00 to battery. The energization of the clutch magnet 2–02 releases the distributor 2–00 for one rotation, opening and closing the previously described circuit across the T and R connections of the sending loop by way of leads 3–06 and 3–07 in accordance with the coding of the segments of distributor 2–00.

With relays G and CF, Fig. 2, released the distributor leads terminating in segments 1, 2, 4 and 5 of distributor 2–00 are connected to lead 3–06 by way of the break contacts of relays G and CF. Thus the distributor is coded to transmit a Figures character constituting the first character of the transmitter start code sequence.

During the start pulse of the Figures character, auxiliary contact 2–01 opens removing ground from lead 1–06. This removes the previously described shunting ground from relay A1 and relay A1 operates due to the previously described operating path via the contacts of relay A operated. Relay A1 operated opens the locking path of relay X0 by way of lead 4–01 releasing relay X0 and transfers the clutch magnet path from lead 4–05 via break contacts of upper transfer contacts of relay A1 to lead 1–27 via make contacts of the transfer contacts. In addition, relay A1 operated opens the operating path of slow release relay DS by way of lead 1–00 and transfers the auxiliary contact pulsing lead from lead 1–06 via break contacts of lower transfer contacts of relay A1 to lead 1–28 via make contacts of the transfer contacts. Relay X0 released reapplies the above-mentioned shunting ground on relay S1 by way of lead 1–26 releasing relay S1 and opens the operating path for relay SZ2 by way of lead 1–21. Relay SZ2 released opens the operating path of relay CB and relay CB releases. Relay DS being slow release will not release until the Figures character has been transmitted.

During the transmission of the fifth pulse of the Figures character, auxiliary contact 2–01 is again closed placing ground on lead 1–28 and thus operating relay B. Relay B operated completes a path from ground via upper break contacts of relay C1, lead 1–29, upper make contacts of relay B, the winding of relay B1, lead 1–28 and the winding of relay B to battery, holding relay B operated. Relay B1 does not operate at this time, however, due to the shunting ground on lead 1–28. When relay DS releases it completes an operating path for relay G from ground by way of make contacts of relay DS, lead 1–30 and the winding of relay G to battery operating relay G which will lock via its upper make contacts, lead 2–05 and lower break contacts of relay C to ground.

Relay G operated will apply ground on lead 1–27 of the clutch magnet path by way of make contacts of relay G, lead 2–07 and break contacts of relay DS released, releasing distributor 2–00 for its second revolution. Relay G operated will also extend the distributor leads from segments 1 through 5 of distributor 2–00 to the wipers of arcs 1 through 5 of the step on release selector generally indicated at 2–06, by way of leads 2–11 through 2–15, respectively, whereby the second character of the code sequence is determined by the position and strapping of selector 2–06.

The arcs of selector 2–06 are strapped in accordance with the start codes of the outlying stations. As shown in Fig. 2, point 1 of arcs 1 and 2 are strapped to lead 3–06 thus completing a path from segments 1 and 2 of distributor 2–00 to lead 3–06 when the wipers are on point 1 whereby the distributor is coded for the character A. Points 2 through 5 of the selector are shown as coded for characters B, C, D and E. It is to be understood that any desired strapping may be employed in accordance with a desired rotation in selecting outlying station transmitters.

During the transmission of the start element of the second character, auxiliary contact 2–01 opens removing ground from lead 1–28 whereupon relay B1 operates. Relay B1 operated transfers the auxiliary contact pulsing lead from lead 1–05 via break contacts of upper transfer contacts of relay B1 to lead 1–31 via the make contacts of the transfer contacts and opens the locking path for relays A and A1 by way of lead 1–08 whereupon relays A and A1 release. Relay B1 operated also completes an operating path for relay CC from battery by the winding of relay CC, lead 1–32 and the make contact of the upper transfer contacts of relay B1 to ground and opens the energizing path of clutch magnet 2–02 via lead 1–22 and the upper break contacts of relay B1.

Relay CC operated locks via its upper make contacts, lead 1–33 and the break contacts of the lower transfer contacts of relay D. Relay CC also completes an operating path for relay CF from battery by way of winding of relay CF, lead 1–35, lower break contacts of relay D and upper make contacts of relay CC to ground.

The release of relay A1 reoperates relay DS which in turn opens the previously-described operating path for relay G.

When the fifth pulse of the second character is reached, auxiliary contact 2–01 closes placing ground on lead 1–31 and thus operating relay C. Relay C operated completes a path from ground via the upper break contacts of relay D1, lead 1–38, upper make contacts of relay C, lead 1–37, the winding of relay C1, lead 1–31 and the winding of relay C to battery holding relay C operated. Relay C1 does not operate at this time, however, due to the shunting ground on lead 1–31. Relay C operated also breaks the locking path of relay G by way of lead 2–05 and lower break contacts of relay C and opens the operating path for slow release relay F by way of lower break contacts of relay C. Relay F is made slow release to insure that coding relay G releases first.

With relay G released and relay CF operated the distributor leads terminating in segments 1 and 3 of distributor 2–00 are connected to sending loop lead 3–06 by way of the contacts of relay G released and relay CF operated coding the distributor for the character S. When relay F releases the energizing path for clutch magnet 2–02 is transferred from lead 1–23 to lead 1–36 which is grounded by way of the break contacts of the lower transfer contacts of relay C1. Clutch magnet 2–02 is thus energized releasing the distributor for rotation to send the third character S.

When the distributor reaches the start pulse of the character S, auxiliary contact 2–01 opens removing ground from lead 1–31 in the auxiliary contact pulsing lead and thus operating relay C1.

Relay C1 operated opens the locking path for relays B and B1 by way of lead 1–29 and the relays will release. Relay C1 operated also completes an energizing path for step magnet 2–21 of selector 2–06 from battery by way of the winding of step magnet 2–21, lead 1–39 and the make contacts of the upper transfer contacts of relay C1 and transfers the energizing path for clutch magnet 2–02 from ground via the break contacts of the lower transfer contacts of relay C1 to lead 1–42 by way of the make contacts of the transfer contacts of relay C1. In addition, relay C1 operated transfers the auxiliary contact pulsing lead from lead 1–04 to lead 1–41 by way of the make contacts of upper transfer contacts of relay C1. Relay B1 released opens the operating path for relay CC by way of lead 1–32.

When distributor 2–00 reaches the fifth pulse of the character S auxiliary contacts 2–01 close placing ground on lead 1–41. This ground is applied to the winding of relay D by way of lower break contacts of relay A and lead 1–43 operating relay D.

Relay D operated completes a path from ground via the make contacts of the lower transfer contacts of relay D, lead 1–44, winding of relay D1, lead 1–41, lower break contacts of relay A, lead 1–43, and the winding of relay D to battery holding relay D operated. Relay D1 does not operate at this time due to the shunting ground on lead 1–41. Relay D operated also opens the locking path of relay CC by way of lead 1–33 and opens the operating path of relay CF by way of lead 1–35 releasing relays CC and CF. In addition, relay D operated completes a path from ground by way of the upper make contacts of relay D, lead 1–45, winding of relay CL, Fig. 2, lead 1–46 and the lower break contacts of relay A to battery operating relay CL.

With relays G and CF released, and relay CL operated, the distributor leads terminating in segments 1 through 5 of distributor 2–00 are connected to lead 3–06, coding the distributor for a Letters character. Relay CL operated also applies ground to lead 1–42 in the energizing path of clutch magnet 2–02 by way of the break contacts of the lower transfer contacts of relay D1, lead 1–47 and the upper make contacts of relay CF, energizing clutch magnet 2–02 and releasing distributor 2–00 to transmit the Letters character to the sending loop. In addition, relay CL operated opens the locking path for relay S2 by way of lead 3–09. The resultant release of relay S2 opens the holding path for slow release relay SU and relay SU will release after the transmission of the Letters character to unblind monitor printer 2–23 as previously described.

When distributor 2–00 reaches the start pulse of the Letters character, auxiliary contact 2–02 opens removing ground from lead 1–41 and relay D1 operates. Relay D1 operated opens the locking paths for relay C and slow release relay C1 by way of lead 1–38 and relays C and C1 release. Relay D1 operated also opens the energizing path for clutch magnet 2–02 by way of lead 1–47 and transfers the auxiliary contact pulsing lead from lead 1–03 to lead 1–06 by way of the make contacts of the make-before-break contacts of relay D1. In addition, relay D1 operated completes a path from ground via the make contacts of the lower transfer contacts of relay D1, lead 1–48 and the winding of relay HU1, Fig. 4, to battery operating slow release relay HU1. The function of relay HU1 will be subsequently described.

Relay C released recloses the operating path for relay F and relay F operated transfers the energizing path of clutch magnet 2–02 back to lead 1–23. Relay C1 released opens the operating path for step magnet 2–21 of selector 2–06 by way of lead 1–39, deenergizing step magnet 2–21 and thus stepping the wipers of selector 2–06 to point 2.

When distributor 2–00 reaches the fifth pulse of the Letters character, auxiliary contact 2–02 closes providing ground to lead 1–06 and thus operating relay A, as previously described. Relay A operated breaks the holding path of relays D and D1 by way of lead 1–41, lower break contacts of relay A and lead 1–43 releasing relays D and D1. In addition, relay A operated opens the operating path for relay CL by way of lead 1–46 and the lower break contacts of relay A, releasing relay CL.

Relay D1 released transfers the auxiliary contact pulsing lead back to lead 1–03 by way of the break contacts of its continuity contacts maintaining ground on lead 1–06 by way of the previously-described auxiliary contact pulsing leads 1–05 and 1–50 thus maintaining relay A operated and relay A1 released. Distributor 2–00 has now stopped and the circuit is in its initial condition with relay A operated, with the exception that the selector has stepped to the next successive point.

Upon the transmission of the character S in the start code sequence Figures AS Letters by code distributor 2–00 sequential selector 3–22, which had been placed in the select condition by the end-of-message signal of the previous message transmitted from transmitter 3–00, momentarily closes contacts 3–26. This completes a path from ground by way of contacts 3–26, lead 3–51, the upper break contacts of counting relay E1, the upper break contacts of counting relay E2, lead 3–52, upper break contacts of relay E3, the upper break contacts of counting relay E4, the upper break contacts of counting relay E5, lead 4–31, break contacts of the make-before-break contacts of relay E0 and the winding of relay E0 to battery. Relay E0 operates to prepare the counting circuit of relays E1 through E5 and locks by way of the make contacts of its make-before-break contacts, the break contacts of the make-before-break contacts of relay E1, lead 3–53, the lower break contacts of relay SZ1, Fig. 4, lead 4–32, the upper break contacts of relay HL, lead 4–33 and the make contacts of the transfer contacts of relay RL, Fig. 3, to ground. Relay E0 operated extends the sequential selecting pulsing lead 3–51 to the winding of relay E1 by way of the make contacts of the transfer contacts of relay E0. Relay E1 is thus operated and locks to lead 3–53 by way of its lower make contacts and the break contacts of the make-before-break contacts of relay E2. Relay E1 operated transfers the locking path of relay E0 from lead 3–53 to the sequential selector pulsing lead 3–51 by way of the make contacts of the make-before-break contacts of relay E1. Relay E1 operated also opens the previously-described operating path for relay E0.

When contacts 3–26 reopen, removing the ground from the sequential selector pulsing lead 3–51, relay E0 releases and extends sequential selector pulsing lead 3–51 to the winding of relay E2 by way of the break contacts of the transfer contacts of relay E0 and the make contacts of the transfer contacts of relay E1 operated.

Returning now to relay D1 which operates during the transmission of the start pulse of the Letters character and in turn operates slow release relay HU1, relay HU1, operated, completes an obvious operating path for slow release relay HU. The release of relay D1 after the transmission of the fifth pulse of the Letters character opens the operating path of relay HU1 and relay HU1 releases and, in turn, releases relay HU. Relay HU will not release, however, until after the transmitter of outlying station A has been selected by the start code sequence and started to send under the condition that it has been supplied with message material.

Assuming now that the transmitter of outlying station A is started, relay RL follows the incoming signals, removes the locking ground applied to lead 3–53 and periodically closes the make contacts of its transfer contacts completing a path from ground by way of lead 3–55, the upper make contacts of relay HU, lead 5–35, the lower break contacts of relay AD, lead 4–36 and the winding of relay HL to battery. Relay HL is operated and locks by way of its lower make contacts and the lower make contacts of relay HU operated to ground. Relay HL, operated, opens the previously-described locking path for relay FH and further removes the locking ground applied to lead 3–53 by way of the upper break contacts of relay HL. When relay HU releases, the locking path for relay HL is opened and relay HL releases. The removal of the locking ground on lead 3–53 releases relay E1 and resets the counter to its initial condition and, with relays S1, S2, FH, SZ2 and CB now released, transmitter 3–00 can now start in the same manner as previously described. If, however, transmitter 3–00 is not supplied with tape, then, upon the completion of the message from outlying station A, tube T–1 will fire and coding distributor 2–00 will send out the next successive code sequence.

Assuming now that outlying station A is not supplied with message material when polled by the central station, relay RL remains operated and relay HL will not operate and tube T1 will fire to initiate the transmission of the second code sequence, Figures BS Letters. When the S character is transmitted, selector contacts 3–26 will momentarily close placing ground on sequential selector lead 3–51 operating relay E2, which will lock to lead 3–53 by way of its lower make contacts, lead 3–57 and the make contacts of the make-before-break contacts of relay E3, Fig. 4. Relay E2, operated, transfers the locking path of relay E1 from lead 3–53 from lead 3–51 by way of the make contacts of the make-before-break contacts of relay E2 and opens the previously-described operating path for relay E0. When selector contacts 3–26 open removing ground from lead 3–51, relay E1 releases and extends lead 3–51 to the winding of relay E3 by way of the break contacts of the transfer contacts of relay E0, the break contacts of the transfer contacts of relay E1, the make contacts of the transfer contacts of relay E2 operated and lead 3–58.

If outlying station B has message material, relay HL is operated, releasing relay E2 to reset the counter and releasing relay FH in the same manner as previously described. Assuming, however, that outlying station B does not have message material, code distributor 2–00 will send the third code sequence and selector contacts 3–26 will again close placing ground on lead 3–51 and operating relay E3 which locks to lead 3–53 by way of its lower make contacts and the break contacts of the make-before-break contacts of relay E4. Relay E3 operated transfers the locking path of relay E2 from lead 3–53 to lead 3–51 by way of the make contacts of the make-before-break contacts of relay E3 and opens the previously-described operating path for relay E0 by way of the upper break contacts of relay E3. When contacts 3–26 reopen, removing ground from lead 3–51, relay E2 releases extending lead 3–51 to the winding of relay E4 by way of the contacts of relays E0 and E1, the break contacts of the transfer contacts of relay E2, lead 3–59 and the make contacts of the transfer contacts of relay E3 operated.

The transmission of the fourth start code sequence recloses contacts 3–26 and thus operating relay E4 which locks to lead 3–53 by way of its lower make contacts and the break contacts of the make-before-break contacts of relay E5. Relay E4, operated, transfers the locking path of relay E3 from lead 3–53 to lead 3–51 by way of the make contacts of the make-before-break contacts of relay E4 and opens the operating path for relay E0 by way of the upper break contacts of relay E4. When contacts 3–26 subsequently reopen removing ground from lead 3–51, relay E3 releases and extends sequential selector pulsing lead 3–51 to the winding of relay E5 by way of the contacts of relays E0, E1 and E2, lead 3–59, the break contacts of the transfer contacts of relay E3 and upper make contacts of relay E4.

The transmission of the fifth start code sequence closes contacts 3–26 and relay E5 operates and locks to lead 3–53 by way of its lower make contacts. Relay E5, operated, transfers the locking path of relay E4 from lead 3–53 to lead 3–51 by way of the make contacts of the make-before-break contacts of relay E5 and relay E4 releases when contacts 3–26 subsequently reopen. Relay E5, operated, opens the previously-described operating path for relay E0 by way of its upper break contacts and opens the previously-described operating path for relay FH by way of its upper break contacts. With relay FH released, transmitter 3–00 can now start sending if it is supplied with a message tape. Assuming message transmitter 3–00 does start to send, relay SZ1, Fig. 4, operates and removes the locking ground applied to lead 3–53 by way of the lower break contacts of relay SZ1 whereupon relay E5 releases resetting the counter to its initial condition.

Assuming now that a message tape has not been inserted in transmitter 3–00, relay E5 remains operated and, since relay SZ1 is released, code transmitter 2–00 will now proceed to send the sixth start code sequence. The resultant closure of contacts 3–26 at this time does not perform any function since the operating path of relay E0 has been opened by relay E5 operated. Therefore, after the sixth start code sequence has been transmitted message transmitter 3–00 will again be given the opportunity to send in the same manner as at the conclusion of the transmission of the fifth code sequence. This process will be repeated until a message tape is inserted in transmitter 3–00 whereupon transmitter 3–00 will start sending after the start code sequence has been transmitted and thus release relay E5 and reset the counter.

It is to be understood that if an outlying station responds to a start code sequence, relay HL operates and releases relay E5 thus resetting the count. Thus the counter is reset if the message transmitter starts or an outlying station transmitter is successfully polled and, as previously described, message transmitter 3–00 is given the opportunity to send if an outlying station transmitter responds to the start code sequence or if five outlying station transmitters are unsuccessfully polled. Moreover, after five outlying station transmitters have been unsuccessfully polled, the message transmitter will be given the opportunity to send after each succeeding polling of an outlying station transmitter until the message transmitter is successfully started or a station is successfully polled. Relay E5 of the counter, however, will be maintained operated until the message transmitter is started or an outlying station transmitter is successfully polled.

If the central station tape transmitter 3–00 sends a message which exceeds ninety seconds, the restarting of the transmitter is held up until five outlying station transmitters are polled, regardless of whether any of the outlying stations have message material. In effect, this arrangement gives preference to the outlying station transmitters in that each of the five outlying stations can send its message before the central station is given an opportunity to send.

During the transmission of a message from tape transmitter 3–00, slow release relay SL1, Fig. 4, is maintained operated, as previously described. Relay SL1 operated removes ground from lead 4–41 by way of the upper break contacts of relay SL1 and condenser C–11 slowly charges from positive battery by way of resistor R–14 and applies this increasing voltage to the control anode of tube T–2 by way of resistor R–13. Under normal short message operation, transmitter 3–00 will complete the message transmission and stop sending, thus releasing relay SL1 and reapplying ground to lead 4–41 before tube T–2 fires. Assuming, however, that the message exceeds ninety seconds before transmitter 3–00 stops, condenser C–11 sufficiently charges to fire tube T–2 and plate current is drawn from battery by way of relay AD and the break contacts of its make-before-break contacts, operating relay AD which locks via the make contacts of its make-before-break contacts, lead 4–42 and the upper break contacts of relay E5 to ground. Relay AD operated opens the plate circuit of tube T–2 and the tube is extinguished.

Relay AD operated also opens the previously described operating path for relay HL via the lower break contacts of relay AD. Relay HL is thus prevented from operating in response to a successful polling of an outlying station transmitter.

In addition, relay AD operated applies ground to the counting relays locking lead 3–53 via the lower make contacts of relay AD, lead 4–33, the upper break contacts of relay HL, lead 4–32 and the lower break contacts of relay S21. Thus the counting relays cannot be reset by a successful polling of an outlying station.

At the conclusion of the long message from the central station, relay FH operates and locks, as previously described, and tube T–1 fires to initiate the sending of a start code sequence to poll the first outlying station. Transmission of the code sequence closes sequential selector contacts 3–26 which, in turn, operate counting relay E1. If the first outlying station is successfully polled, the message signals received by the central station is followed by relay RL which opens the locking path of relay E1 and places ground on lead 3–55 in the operating path of relay HL. Relay HL cannot operate, however, since the operating path is open with relay AD operated and relay E1 does not release since relay AD maintains a locking ground on lead 3–53. Consequently, with relay AD operated, the successful polling of an outlying station does not reset the counter and, with relay HL not permitted to operate, relay FH does not release to give the central station message transmitter an opportunity to send.

When the first outlying station transmitter completes the transmission of its message, tube T–1 again fires and the second start code sequence is sent. In this manner, the five outlying station transmitters are polled until counting relay E5 is operated. Relay E5 operated releases relay FH, as previously described, and opens the locking path of relay AD via the upper break contacts of relay E5. The operation of relay E5 and the release of relay AD returns the circuit to the previously described assumed condition wherein five outlying station transmitters are unsuccessfully polled.

It may be desirable to stop the transmission of start codes from the central station. Locking stop key 1–12, Fig. 1, is provided for this purpose. Operation of stop key 1–12 opens the previously described locking path for relay FH by way of the break contacts of key 1–12. Since relay FH cannot lock when operated after the transmission of the end-of-message signal by the message transmitter, the message transmitter is enabled to send the next message without waiting for the transmission of the start codes.

Operation of stop key 1–12 also completes a path from ground via the break contacts of the transfer contacts of slow release relay TS, Fig. 1, the break contacts of slow release relay TS1, the make contacts of stop key 1–12 and the winding of relay MS to battery, operating relay MS. Relay MS operated opens the previously described energizing path for clutch magnet 2–02 via the break contacts of relay MS and places ground on lead 1–09 by way of the make contacts of relay MS. Ground on lead 1–09 maintains condenser C–10 discharged whereby tube T–1 cannot fire to operate relay X0. Since relay X0 cannot operate and the energizing path for clutch magnet 2–02 is open, code distributor 2–00 is disabled.

If stop key 1–12 is operated while code distributor 2–00 is sending a start code sequence, code distributor is not disabled until the code sequence is transmitted. Recalling now the polarized relay PS is operated to its marking contact when contacts 2–01 are closed and contacts 2–01 periodically open during the transmission of the start code sequence, the periodic operation of the armature of relay PS to the spacing contact during the transmission of the start code sequence completes an obvious operating path for slow release relay TS and relay TS operated completes an obvious operating path for slow release relay TS1. The cumulative release times of relays TS and TS1 are adjusted to maintaining relays TS and TS1 operated during the transmission of the start code sequences, thus maintaining the previously described operating path for relay MS open.

At the conclusion of the transmission of the start code sequence, relays TS and TS1 release permitting relay MS to operate and disable code distributor 2–00 and, since relay FH is released by the operation of key 1–12, the message transmitter is enabled to send the next message upon the release of relay S2, as previously described.

A typical outlying station, shown in detail in Fig. 5, includes a transmitter distributor, generally indicated at 5–00, a receiving printer, generally indicated at 5–21 and a sequential selector, generally indicated at 5–22. Transmitter 5–00, printer 5–21 and selector 5–22 are similar to transmitter 3–00, printer 3–21 and selector 3–22, previously described in connection with the central station apparatus.

Signals from the central station are received over the sending loop whose R and T connections are connected by way of lead 5–02 and the winding of polarized relay TR whereby relay TR follows incoming line signals. The marking contact of relay TR is connected to the select magnet of sequential selector 5–22 whereby sequential selector 5–22 follows incoming line signals. Sequential selector 5–22 is placed in the select condition by an incoming Figures H character sequence and momentarily opens contacts 5–25 and is placed in the unselect condition by a Carriage-Return Line-Feed sequence. During the select condition, an incoming sequence of the upper case transmitter start character individual to the outlying station followed by the character S momentarily closes contacts 5–26 and an incoming upper case printer selection character momentarily closes contacts 5–27. In outlying station A, for example, the start character may be A in the start code sequence Figures AS Letters and the selection character may be R in the printer selector code sequence Figures R Letters.

The spacing contact of relay TR provides shunting battery for the select magnet of printer 5–21 by way of the lower make contacts of relay PR. Since the select magnet of printer 5–21 is maintained in the idle marking condition by current from battery via the select magnet winding and resistor R–15 to ground, printer 5–21 is blinded when relay PR is released and prints the incoming signals when relay PR is operated.

Signals from tape transmitter distributor 5–00 are transmitted to the central station over the receiving loop whose R and T connections are connected via lead 5–05 and the stop segment, the brushes and the common segment of transmitter distributor 5–00 when the transmitter is idle and via lead 5–05 and tape sensing pins 5–36, the distributor segments and associated leads, the brushes and the common segment of transmitter distributor 5–00 when the transmitter is sending.

The outlying station operator prepares each message by punching a tape with the desired codes and inserting the tape in transmitter distributor 5–00. The format of the message may be identical with the messages originating at the central station, including the selection codes preceding the message text and the end-of-message signal succeeding the message text. Each message is prepared on a separate tape.

Assuming that sequential selector 5–22 is in the select condition due to the receipt of the end-of-message signal, Figures H, of the previous message and the start code sequence of the outlying station is received, contacts 5–26 momentarily close completing an obvious operating path for relay T1. If a message tape is not inserted in tape transmitter 5–00, tape-out contacts 5–01 are open, and relay T1 releases when contacts 5–26 reopen. Relay T1 operated opens the operating path for normally-operated slow-release relay T2. Relay T2 is adjusted not to release, however, if relay T1 is only momentarily operated. Thus, the outlying station does not respond to the start code sequence when a tape is not inserted in transmitter 5–00.

If a message tape is inserted in tape transmitter 5–00 when the start code sequence is received, tape-out contacts 5–01 are closed and relay T1 operated locks via its upper make contacts and contacts 5–01. With relay T1 maintained operated, relay T2 releases, completing an obvious energizing path for start magnet 5–33 of transmitter 5–00. The energization of start magnet 5–33 starts transmitter 5–00 which opens and closes the receiving loop in accordance with the rotation of the distributor and the operations of sensing pins 5–36 which sense the perforations in the message tape.

At the conclusion of the message, the message tape runs out of transmitter 5–00 and tape out contacts 5–01 open, breaking the locking path for relay T1. Relay T1 releases, operating relay T2 which, in turn, opens the energizing path for start magnet 5–33 and transmitter distributor 5–00 stops.

The outlying station responds to the printer selection code sequences whenever sequential selector 5–22 is in the select condition. This may occur at the same time that transmitter 5–00 is sending. If the selection code sequence of the outlying station is received, with sequential selector 5–22 in the select condition, contacts 5–27 momentarily close preparing a path from battery via the winding of relay PR, lead 5–11 and contacts 5–27 to ground. Relay PR operates and locks via its upper make contacts, lead 5–12 and normally-closed Figures H contacts 5–25.

Relay PR operated completes the previously-described path from the spacing contact of relay TR to the select magnet of printer 5–21 via the lower make contacts of relay PR, unblinding printer 5–21 which prints the incoming signals.

When the end-of-address code of the incoming message is received, sequential selector 5–22, which is following the incoming signals, is placed in the unselect condition whereby contacts 5–26 and 5–27 cannot operate during reception of the message text. At the conclusion of the message, end-of-message signal Figures H Letters is received, sequential selector 5–22 is placed in the select condition and contacts 5–25 momentarily open, opening the locking path of relay PR. Relay PR releases and opens the path from the spacing contact of relay TR to the select magnet of printer 5–21, reblinding the printer.

The specific embodiment of this invention shown and described herein is by way of illustration only and should not be considered as limited thereto but capable of modification without departing from the spirit of the invention and within the scope of the appended claims.

What is claimed is:

1. In a telegraph system, a two way telegraph channel, a tape transmitter for transmitting telegraph messages to said channel, a code transmitter for transmitting code sequences to said channel, receiver detector means responsive to the reception of signals from said channel for initiating the operation of said tape transmitter, a timing circuit responsive to the operation of said tape transmitter for a predetermined maximum interval of time for disabling said detector means, a counting circuit responsive to the transmission of a predetermined number of said code sequences by said code transmitter to said channel for initiating the operation of said tape transmitter and resetting said timing circuit and means responsive to the initiation of the operation of said tape transmitter for resetting said counting circuit.

2. In a telegraph system, a two way telegraph channel, a tape transmitter for transmitting telegraph messages to said channel, receiving means effective in the absence of the reception of signals from said channel, a code transmitter responsive to said effective receiving means for transmitting code sequences to said channel, receiver detector means responsive to the reception of signals from said channel for initiating the operation of said tape transmitter, a timing circuit responsive to the operation of said tape transmitter for a predetermined maximum interval of time for disabling said detector means, a counting circuit responsive to the transmission of a predetermined number of said code sequences by said code transmitter to said channel for initiating the operation of said tape transmitter and means responsive to the operation of said tape transmitter for resetting said counting circuit and disabling said code transmitter.

3. In a telegraph system, a telegraph station, a two way communication channel extending from said station, a tape transmitter at said station for transmitting telegraph messages to said channel, receiving means at said station effective in the absence of the reception of signals from said channel, a code transmitter responsive to said effective receiving means for transmitting code sequences to said channel, a counting circuit responsive to the transmission of a predetermined number of said code sequences by said code transmitter to said channel for conditioning said tape transmitter for operation, receiver detector means responsive to the reception of signals from said channel for conditioning said tape transmitter for operation, start means responsive to the storage of tape in said tape transmitter for initiating the operation of said tape transmitter, a timing circuit responsive to the operation of said tape transmitter for a predetermined maximum interval of time for disabling said detector means and means responsive to the operation of said tape transmitter for disabling said code transmitter and resetting said counting circuit.

4. In a telegraph selection system, a central station, a two way telegraph channel extending from said central station, a tape transmitter at said central station for transmitting message signals to said channel, a code transmitter at said central station for transmitting start code sequences to said channel, means responsive to the transmission of a predetermined number of said code sequences by said code transmitter for initiating the operation of said tape transmitter, receiver detector means responsive to the reception of signals from said channel for initiating the operation of said tape transmitter, means responsive to the initiation of the operation of said tape transmitter for disabling said code transmitter and a timing circuit responsive to the operation of said tape transmitter for a predetermined maximum interval of time for disabling said detector means.

References Cited in the file of this patent

UNITED STATES PATENTS

| | | |
|---|---|---|
| 2,667,533 | Zenner | Jan. 26, 1954 |
| 2,714,626 | Locke | Aug. 2, 1955 |